(12) United States Patent
Shimizu et al.

(10) Patent No.: US 7,369,970 B2
(45) Date of Patent: May 6, 2008

(54) METHOD AND APPARATUS FOR ESTIMATING PRODUCT COST

(75) Inventors: Masakatsu Shimizu, Saitama (JP); Akio Kawano, Saitama (JP); Eiji Yamamoto, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 516 days.

(21) Appl. No.: 09/891,367

(22) Filed: Jun. 27, 2001

(65) Prior Publication Data

US 2002/0026392 A1   Feb. 28, 2002

(30) Foreign Application Priority Data

Jun. 27, 2000   (JP) ............................ 2000-192585

(51) Int. Cl.
  *G06F 17/50*   (2006.01)
(52) U.S. Cl. .................. 703/1; 703/6; 700/97; 705/1; 705/400
(58) Field of Classification Search .............. 700/97; 703/1, 2, 6, 7; 705/1, 7, 8, 30, 400
  See application file for complete search history.

(56) References Cited

U.S. PATENT DOCUMENTS

| | | | | |
|---|---|---|---|---|
| 4,887,207 A | * | 12/1989 | Natarajan | 705/10 |
| 5,063,506 A | * | 11/1991 | Brockwell et al. | 705/7 |
| 5,249,120 A | * | 9/1993 | Foley | 705/1 |
| 5,570,291 A | * | 10/1996 | Dudle et al. | 700/95 |
| 5,581,672 A | * | 12/1996 | Letcher, Jr. | 345/420 |
| 5,717,598 A | * | 2/1998 | Miyakawa et al. | 700/103 |
| 5,765,137 A | * | 6/1998 | Lee | 705/7 |
| 5,920,849 A | | 7/1999 | Broughton et al. | |
| 6,035,305 A | * | 3/2000 | Strevey et al. | 707/104.1 |
| 6,038,540 A | * | 3/2000 | Krist et al. | 705/8 |
| 6,219,654 B1 | * | 4/2001 | Ruffin | 705/400 |
| 6,223,092 B1 | * | 4/2001 | Miyakawa et al. | 700/103 |
| 6,268,853 B1 | * | 7/2001 | Hoskins et al. | 700/83 |
| 6,304,853 B1 | * | 10/2001 | Malnekoff | 705/27 |
| 6,324,527 B1 | * | 11/2001 | Bajuk et al. | 705/400 |
| 6,343,285 B1 | * | 1/2002 | Tanaka et al. | 705/400 |
| 6,349,403 B1 | * | 2/2002 | Dutta et al. | 716/12 |
| 6,604,081 B1 | * | 8/2003 | Manning et al. | 705/7 |
| 6,609,040 B1 | * | 8/2003 | Brünnemann | 700/108 |
| 6,775,647 B1 | * | 8/2004 | Evans et al. | 703/7 |
| 6,873,963 B1 | * | 3/2005 | Westbury et al. | 705/8 |
| 6,889,196 B1 | * | 5/2005 | Clark | 705/9 |

(Continued)

FOREIGN PATENT DOCUMENTS

JP   A9160945   6/1997

(Continued)

*Primary Examiner*—Andrew Joseph Rudy
(74) *Attorney, Agent, or Firm*—Birch, Stewart, Kolasch & Birch, LLP

(57) ABSTRACT

A development department stores physical characteristic data concerning a product to be manufactured, such as shape and CAD data, in a database. Cost factor data are provided from a plurality of potential makers of the product. The cost factor data is stored in a database. Manufacturing costs are calculated for the respective makers based on the cost factor data, and then displayed. The provided information, the cost factor data stored in the databases, and the estimated manufacturing costs can be browsed through a network. Further, the cost factor data stored in the databases can be updated by the makers through the network.

18 Claims, 5 Drawing Sheets

U.S. PATENT DOCUMENTS

| | | | |
|---|---|---|---|
| 6,928,412 B2 * | 8/2005 | DeBiasse | 705/7 |
| 7,117,060 B2 * | 10/2006 | McPhee et al. | 700/110 |
| 7,249,028 B2 * | 7/2007 | Ibarra et al. | 705/1 |
| 2003/0004768 A1 * | 1/2003 | Bury et al. | 705/7 |
| 2003/0028393 A1 * | 2/2003 | Coulston et al. | 705/1 |

FOREIGN PATENT DOCUMENTS

| | | |
|---|---|---|
| JP | A9231265 | 9/1997 |

* cited by examiner

[FIG. 1]
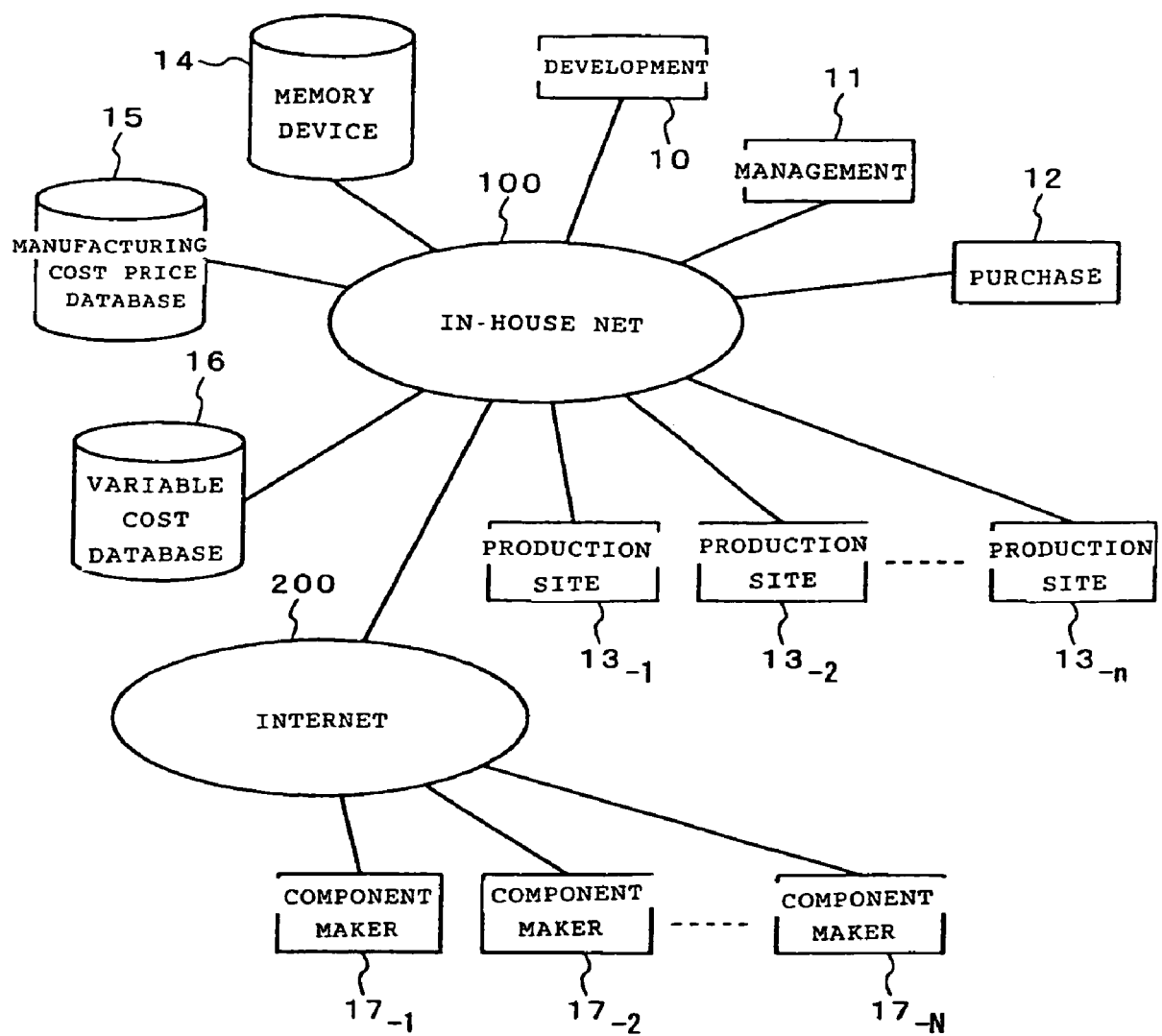

[FIG. 2]
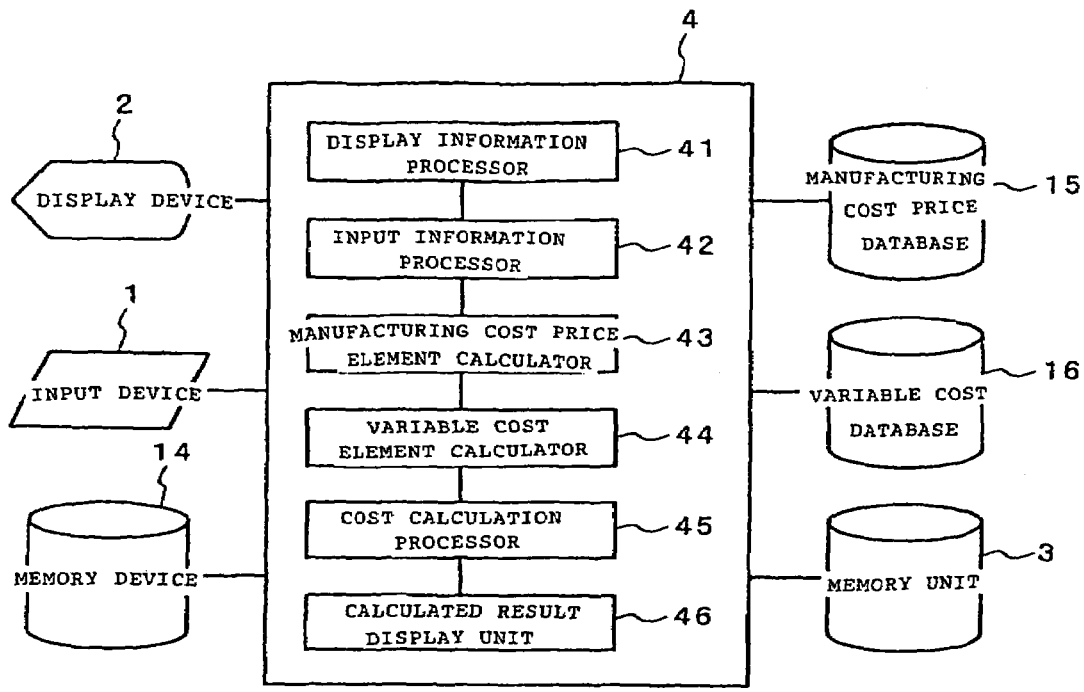
[FIG. 3]
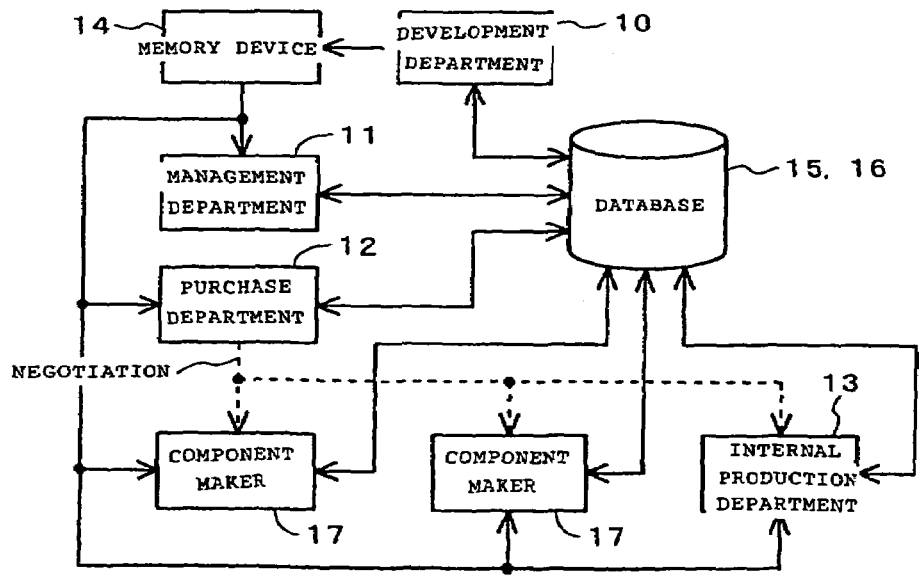

[FIG. 4]
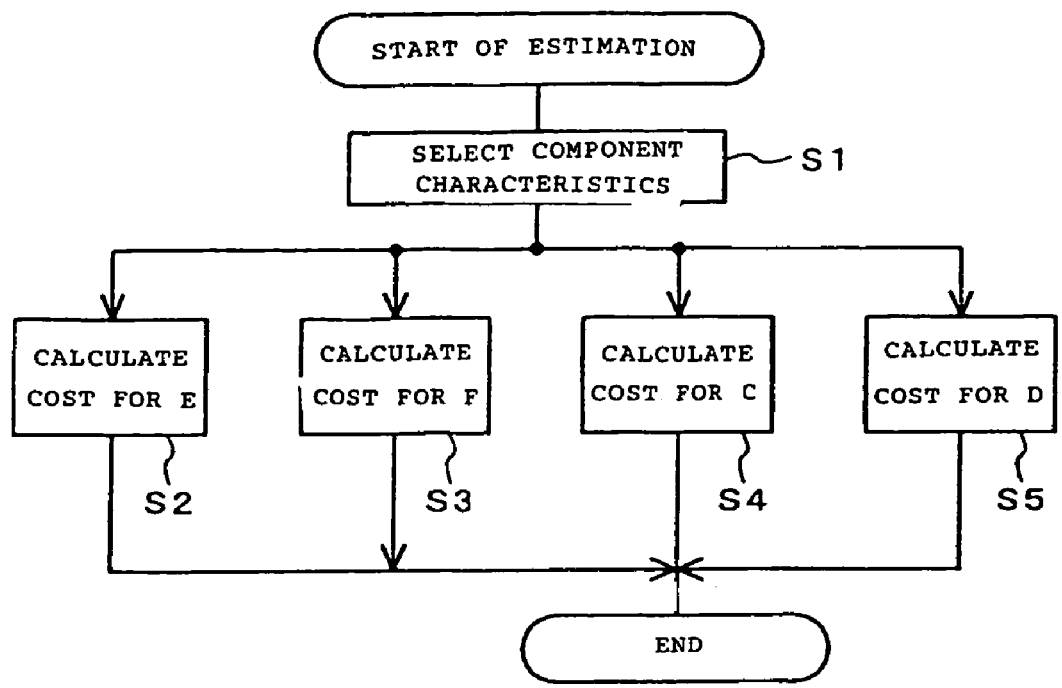

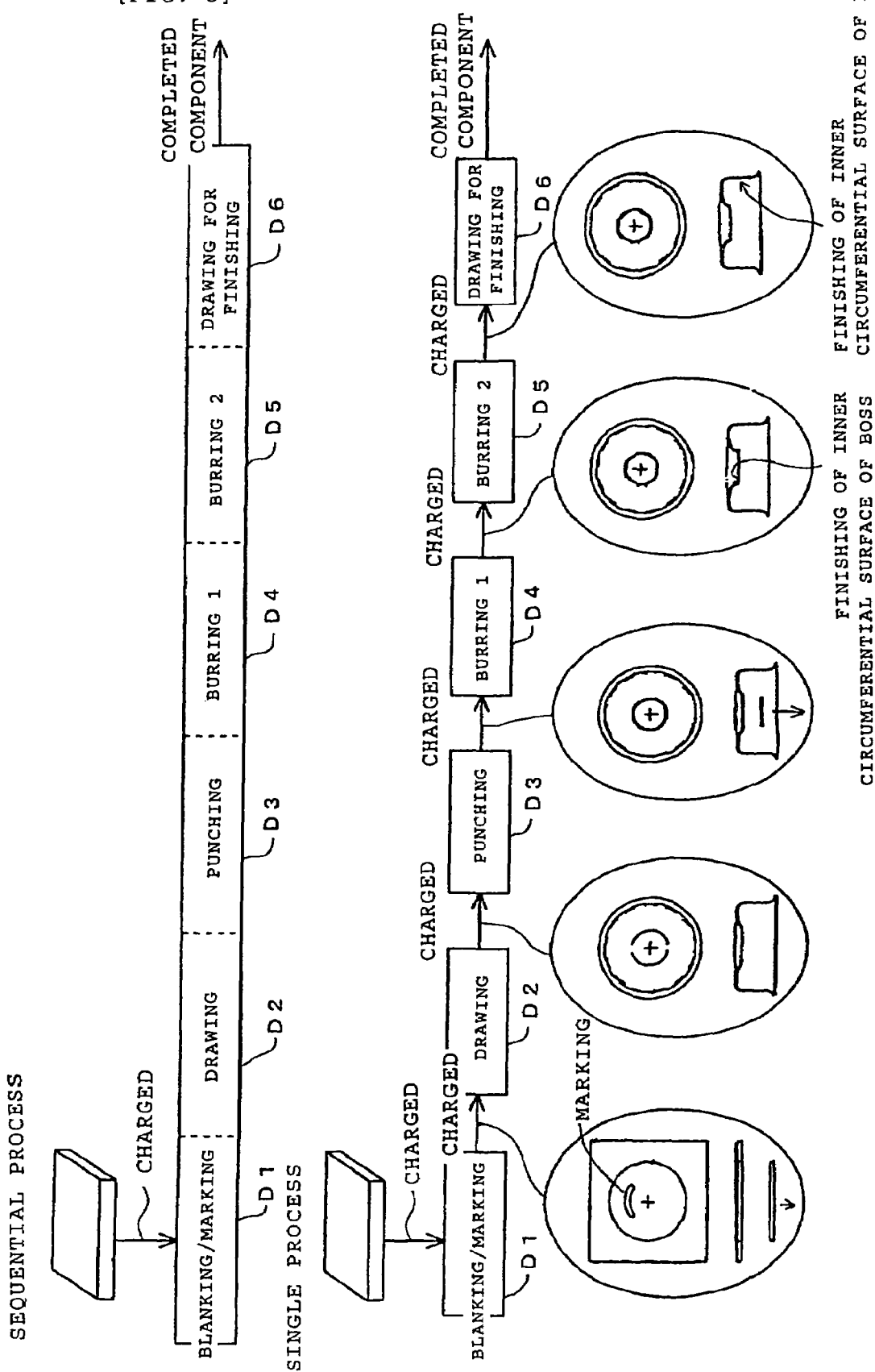

[FIG. 6]
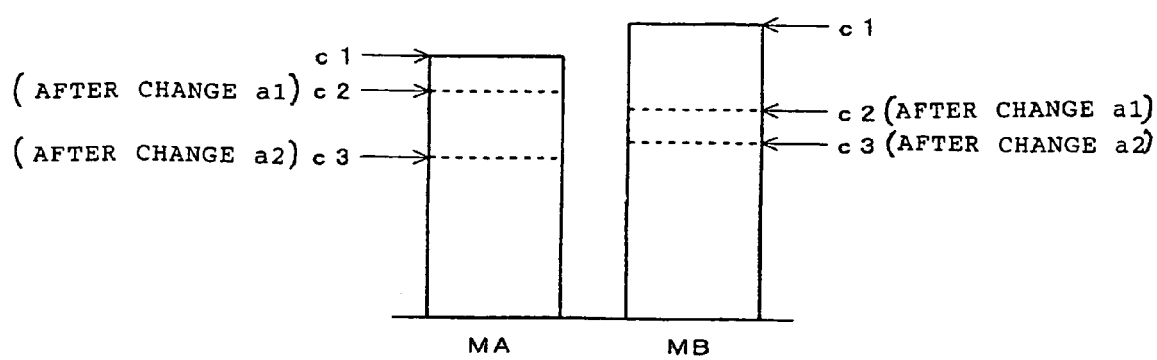

METHOD AND APPARATUS FOR ESTIMATING PRODUCT COST

BACKGROUND OF THE INVENTION

1. Field of the Invention

The present invention relates to a method of, and an apparatus for, estimating the cost of a product. More particularly, the present invention relates to a method of, and an apparatus for, estimating the cost of a product by performing a cost comparison in view of a cost varying factor of the product, whose cost is to be estimated. By the present invention, the cost of the product can be determined highly accurately and quickly.

2. Description of the Relevant Art

An apparatus is known for estimating the cost of a product using a computer. For example, Japanese Patent Laid-open No. Hei 9-160945 discloses an apparatus having a database for storing estimation reference data and a cost element calculator for calculating cost elements based on the estimation reference data. The estimation reference data represent, for example, material information of molded articles, molding machine information, secondary processing information, etc.

Japanese Patent Laid-open No. Hei 9-231265 discloses an apparatus for estimating a processing process from processing element information and product cost factor information. The apparatus calculates processing expenses based on the estimated processing process. The processing element information represents types of processing elements, the number of processing elements, the characteristics of processing elements, etc.

In the devices of the background art, the material expenses and the costs of processing processes are stored in a database. The cost of a product to be estimated is calculated by entering functional information of the product, or a processing process is estimated to increase the accuracy with which to calculate the cost of a product by entering processing element information. However, the devices of the background art for estimating the cost of a product, and methods of estimating the cost of a product using those devices, have drawbacks because the cost is calculated from the standpoint of a manufacturer (estimator) having a single manufacturing facility.

In reality, when manufacturing a given component, options are not limited to a single manufacturing method, but in general a plurality of manufacturing methods or apparatuses can be employed depending on the specifications of the product and the quantity thereof. Detailed configurations suitable for respective manufacturing methods and apparatus are thus available for one component. Accordingly, it is preferable to compare and review costs covering changes in detailed configurations with respect to the respective manufacturing methods and apparatus for designing a component.

For example, for completing a certain component through a plurality of processing processes, it is preferable to compare and review a cost incurred by assigning a general-purpose processing machine to a plurality of processes and a cost incurred by introducing dedicated processing machines altogether to perform a plurality of processes. For comparing and reviewing the manufacture of a component within a company and the manufacture of a component outside of the company, it is preferable to compare and review costs that have been calculated taking into account manufacturing processes within and outside of the company.

These reviews are not infrequent in daily operations, but are often carried out at the time of planning the startup of a process of mass-producing components. Even while components are being mass-produced, if the planned quantity of such components to be manufactured within the company is to be changed, then it is necessary to make the above comparison for the purpose of deciding whether a new investment for equipment is to be made or the job is to be farmed out.

With the devices and methods of estimating the cost of a product in accordance with the background art, the process of comparing and reviewing costs according to different manufacturing facilities or methods, or according to whether the product is to be manufactured within or outside of the company, is time-consuming. the process is time consuming because information required to calculate the costs needs to be entered depending on the different manufacturing facilities or methods or whether the product is to be manufactured within or outside of the company.

SUMMARY OF THE INVENTION

It is an object of the present invention to provide a method of, and an apparatus for, estimating the cost of a product, which will address one or more of the drawbacks associated with the background art.

It is an object of the present invention to provide a method and apparatus suitable for comparing and reviewing costs according to different manufacturing facilities or methods for a product, or according to whether the product is to be manufactured within or outside of the company.

In order to attain the object described above, in accordance with a first feature of the present invention there is provided an apparatus for estimating the cost of a product, characterized in that an input device for receiving an input action, a cost calculation processor for calculating a manufacturing cost based on information inputted from the input device and cost factor data, supplied from an external source, for the calculation of the manufacturing cost, and a display device for displaying a calculated result from the cost calculation processor, the cost calculation processor being arranged to calculate manufacturing costs for respective process series when a plurality of different process series for one component are entered from the input device, the display device being arranged to display the calculated manufacturing costs for the respective process series.

According to the first feature, since the manufacturing costs for the respective process series are calculated and displayed based on the information inputted from the input device and the cost factor data, the differences between the costs for the different process series can easily be compared with each other.

In accordance with a second feature of the present invention, the cost calculation processor is arranged to calculate manufacturing costs for respective processes of the process series, and the display device is arranged to display the calculated manufacturing costs for the respective processes. According to the second feature, since elements making up the process series, i.e., costs for the respective processes, are displayed, factors for cost differences caused by the process series can easily be examined.

In accordance with a third feature of the present invention, in a method of estimating the cost of a product using an apparatus for estimating the cost of a product according to the first or second feature, the cost factor data is read from a database connected through a network, the database stores cost factor data entered from respective providers, and the cost factor data stored in the database are updated by cost factor data entered by the providers through the network.

According to the third feature, since manufacturing costs are calculated using cost factor data stored in the database that is updated by the cost factor data providers, costs can be compared based on latest cost factor data.

In accordance with a fourth feature of the present invention, there is provided a method of estimating the cost of a product, characterized by calculating and displaying manufacturing costs of products for respective providers based on information provided by an estimate seeker and cost factor data provided by a plurality of providers with respect to the information and stored in a database, and browsing the provided information, browsing the cost factor data stored in the database, updating the cost factor data stored in the database, and browsing the displayed manufacturing costs through a network.

According to the fourth feature, cost factor data are provided through the network from the providers who have browsed the information provided by the estimate seeker, and a manufacturing cost is calculated based on the information and the cost factor data. Since the calculated manufacturing cost can be browsed by the providers through the network to update the cost factor data, the manufacturing cost can be calculated using the latest cost factor data that have been updated.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, are not limitative of the present invention, and wherein:

FIG. 1 is a view showing a network including a cost estimating system, according to the present invention;

FIG. 2 is a block diagram of the cost estimating system, according to the present invention;

FIG. 3 is a block diagram of a system arrangement including the cost estimating system;

FIG. 4 is a flowchart illustrating an estimating process;

FIG. 5 is a diagram illustrating an example of a process series; and

FIG. 6 is a view illustrating an example of a comparison of costs due to a shape change.

DETAILED DESCRIPTION OF THE INVENTION

An embodiment of the present invention will be described below with reference to the drawings. FIG. 1 is a view showing a network including a cost estimating system. In FIG. 1, a development department 10, a management department 11, a purchase department 12, and n production sites 13-1, 13-2, ..., 13-n (hereinafter collectively referred to as "internal production department 13") have respective information processing terminals, such as personal computers or the like, which have a function as a component cost estimating apparatus. These information processing terminals are connected to a network 100 (hereinafter referred to as "in-house net"), such as a LAN, an intranet, an extranet, etc.

Memory devices 14, 15 and 16 for storing data are connected to the in-house network 100. The memory device 14 stores information concerning products. For example, the memory device 14 could store information concerning the shape data of components, which are to be estimated. The shape data could be entered or supplied by the development department 10.

The memory device 15 (hereinafter referred to as "manufacturing cost price database 15") stores manufacturing cost prices as a fixed portion of cost factors that determine product prices. The memory device 16 (hereinafter referred to as "variable cost database 16") stores variable cost factors including production quantities, manufacturing methods, wage rates (wages per process), etc. The memory device 14, the manufacturing cost price database 15, and the variable cost database 16 can be realized as a database sharing function by known groupware.

The in-house net 100 can be connected to the Internet 200. Information processing terminals of N component makers 17-1, 17-2, ..., 17-N (hereinafter collectively referred to as "component maker 17") are also connected to the Internet 200. The information processing terminals of the component makers 17 also play a role in the overall component cost estimating apparatus of the present invention. The component makers 17 may be specialists in different fields, e.g., a casting expert, a forging expert, a machining expert, etc., or a plurality of specialists in one field.

In an alternative embodiment, the manufacturing cost price database 15 and the variable cost database 16 are not directly connected to the in-house net 100. In the alternative embodiment, the manufacturing cost price database 15 and the variable cost database 16 are connected to the Internet 200. As a further alternative, the component makers 17 maybe de in the in-house net 100.

FIG. 2 is a block diagram illustrating a cost estimating apparatus found in each of the information processing terminals, and its connection/interaction to other components in FIG. 1. Those reference numerals in FIG. 2 which are identical to those in FIG. 1 represent identical or equivalent parts. In FIG. 2, an input device 1 comprises pointing devices such as a keyboard, a mouse, etc., and an interface device for receiving input actions made by these pointing devices.

The input device 1 is used to enter shape data (drawing values) and manufacturing cost data of components that are to be estimated, and cost factor data such as variable cost data, etc., and commands. The cost factor data comprise data representing material costs, production facility expenses, personnel expenses, management expenses, etc. The input device 1 may include a CAD device for entering shape data of components. A display device 2 comprises a CRT or a liquid crystal display unit, and is used to display an echo of an input action made by the input device 1 and a processed result. A memory unit 3 stores data required for data processing.

A processor 4 comprises a display information processor 41, an input information processor 42, a manufacturing cost price element calculator 43, a variable cost element calculator 44, a cost calculation processor 45, and a calculated result display unit 46. The display information processor 41 extracts information required for estimation from drawing values, etc. entered from the input device 1, and detects shapes and dimensions of components. The input information processor 42 receives information, other than the information relative to shapes and dimensions of components of the information required for estimation from the input device 1, and processes the received information. Processed results from the display information processor 41 and the input information processor 42 are stored in the memory device 14.

The manufacturing cost price element calculator 43 calculates manufacturing cost price elements based on cost prices received from the manufacturing cost price database 15 and data processed by the display information processor 41 and the input information processor 42. The variable cost element calculator 44 calculates variable cost elements based on variable cost factors received from the variable cost database 16 and data processed by the input information processor 42. The cost calculation processor 45 adds manufacturing cost price elements calculated by the manufacturing cost price element calculator 43 and variable cost elements calculated by the variable cost element calculator 44 into a cost total.

Information processing terminals including the input device 1 and the display device 2 may be installed in a plurality of locations such as an estimation seeker such as a designer or the like (the development department 10), the internal production departments 13, and the component makers 17 (hereinafter also referred to as "manufacturers"). The information processing terminals thus installed allow costs to be compared in each manufacturing site at all times based on the latest information.

FIG. 3 is a view showing a system arrangement including the above component cost estimating apparatus. Shape data, etc. entered using the input device 1 in the development department 10 are stored in the memory device 14. The purchase department 12, the internal production departments 13, and the component makers 17 can read the shape data, etc. stored in the memory device 14 through a network such as the in-house net 100, the Internet 200, or the like.

As with the memory device 14, the manufacturing cost price database 15 and the variable cost database 16 can also be accessed from the management department 11, the purchase department 12, the internal production departments 13, and the component makers 17 through a network such as the in-house net 100, the Internet 200, or the like. Particularly, the component makers 17 can write data in the variable cost database 16 in order to register and update variable costs.

Each of the management department 11, the purchase department 12, the internal production departments 13, and the component makers 17 performs cost estimating calculations based on the shape data, etc. read from the memory device 14, the manufacturing cost prices read from the manufacturing cost price database 15, and the variable cost factors read from the variable cost database 16. These departments and component makers make estimates from their own standpoints, and the estimates are stored in the manufacturing cost price database 15 or the variable cost database 16. Since each of the development, management, and purchase departments which are estimate seekers makes an estimate from its own standpoint, it can make a thorough estimate.

It is preferable that the purchase department 12, the internal production departments 13, and the component makers 17 make an estimate for each component, and the management department 11 make an estimate for a final product based on the sum of the estimates for the components. The purchase department 12 negotiates with the component makers 17 based on its own estimates. If the component makers 17 are able to change their own estimates based on the results of the negotiations, then the component makers 17 update the data stored in the manufacturing cost price database 15 or the variable cost database 16.

The development department 10 can retrieve updated estimates and review changes in manufacturing methods and shapes. The purchase department 12 and the component makers 17 can further review the changes in manufacturing methods and shapes, and update the data stored in the manufacturing cost price database 15 or the variable cost database 16.

FIG. 4 is a flowchart showing an estimating process that is carried out in the development department 10. The estimating process is performed in an interactive fashion based on information displayed on the display device 2. When the estimating process is started, the display device 2 displays a request for the selection of component characteristics. The operator selects one of predetermined categories to which the characteristics of a component to be estimated belong. For the manufacture of motorcycles, the categories include, for example, an engine-related field E which primarily involves casting, forging, and machining operations, a frame-related field F which primarily involves pressing, sheet-metal working, resin molding, and casting operations, and a chassis-related field C which primarily involves similar operations, and an electric accessory-related field D which involves various different fabrication processes for various components.

After component characteristics, i.e., a category, are selected in step S1, cost calculating systems for respective components are activated according to the selection in steps S2 through S5. The cost calculating systems for respective components calculate costs according to cost calculating processes for a plurality of prescribed process series. For example, cost tables may be established for the respective process series, and a cost may be retrieved by specifying a component and a process series. A process series refers to a series comprising a combination of process elements put in a sequence and representing a collection of processes required to complete a certain component.

The cost tables that are established for the respective process series allow the operator to easily compare costs of the process series with each other. The operator or the designer in the development department 10 can calculate more correct costs by not only displaying costs for respective process series on the display device 2, but also changing the drawings (shape data) depending on the process series. This is because components of one type produced by forging and machining, respectively, take different shapes including wall thicknesses, beveled states, etc.

Furthermore, costs can be compared based on not only the difference between process series having different processing processes, but also the difference between the following process series. FIG. 5 is a diagram showing flow sequences of machining a cap with a boss according to a sequential process (series process) and machining a cap with a boss according to a single process (parallel process). The sequential process includes a succession of processes including a process (D1) for blanking a material P into a circular workpiece and marking the workpiece, a process (D2) of drawing the workpiece into a cup, a process (D3) of punching a central hole for a boss in the workpiece, a first burring process (D4) for finishing an inner circumferential surface of a boss, a second burring process (D5) for finishing an inner circumferential surface of a hub, and a process (D6) of drawing the workpiece to a finished shape. When the material (rectangular flat plate) P is charged into the process D1, it is machined and outputted sequentially from process to process until it is completed as a component.

In the single process, the above processes D1 through D6 are not related to, but independent of, each other. Semi-products independently machined in the processes D1 through D6 are charged into following processes until they are completed.

In the above process series, the display device 2 may be arranged to display not only costs for the respective process series, but also costs for the respective processes (process elements) of the process series. If the costs are different between the process series based on the displayed costs for the process elements, then a factor which has caused the cost difference can easily be examined.

An example of a comparison of costs due to a shape change is shown in FIG. 6. In FIG. 6, manufacturers MA, MB are two component makers 17 which are specialized in different manufacturing methods or two internal production departments 13 having different production facility capabilities or personnel expenses. Calculated costs C1 were based on drawings (initial conceptual drawings) that are initially produced without concern over the abilities of the manufacturers MA, MB. The calculated cost C1 of the manufacturer MA was lower than the calculated cost C1 of the manufacturer MB. The development department 10 then applied a change a1 to the shapes in order to match the abilities of the manufacturers MA, MB, and produced drawings reflecting the change a1. The resultant calculated cost C2 of the manufacturer MB was lower than the calculated cost C2 of the manufacturer MA. The development department 10 further applied a change a2 to the shapes, and produced drawings reflecting the change a2. The resultant calculated cost C3 of the manufacturer MA was lower than the calculated cost C2 of the manufacturer MB.

By displaying the calculated costs at the respective stages of changing the shapes, the designer in the development department 10 who has seen the displayed costs can determine which manufacturer is better than the other in each stage of design change. If changes can be made up to the stage of the change a2, then an order should be sent to the manufacturer MB. If changes can be allowed only up to the stage of the change a1, then it is preferable to send an order to the manufacturer MA.

If the manufacturer MA or the manufacturer MB is selected for outsourcing, then the purchase department 12 can independently negotiate with the manufacturer 13 at each stage of design change, and can update the data of its own in the databases 15, 16 based on the results of the negotiation with the manufacturer MA or the manufacturer MB. The development department 10 can calculate an estimate based on the latest data.

As is apparent from the foregoing description, according to the present invention, it is possible to compare and review manufacturing costs according to process series for one product, e.g., according to different manufacturing methods. According to the present invention, it is possible to analyze a factor responsible for the difference between manufacturing costs according to a plurality of process series.

According to the present invention, since manufacturing costs are calculated using cost factor data stored in a database that has been updated by cost factor data providers, costs can be compared based on the latest cost factor data. For example, if the cost factor data providers are a plurality of makers or manufacturing sites, then variable factor data in each of the makers and manufacturing sites can be reflected in the manufacturing costs, and the costs according to the makers and manufacturing sites can be compared with each other and their appropriateness can be judged.

According to the present invention, cost factor data are provided through a network from a plurality of providers who have browsed the information provided by an estimate seeker, and a manufacturing cost is calculated based on the information and the cost factor data. Since the calculated manufacturing cost can be browsed by the providers through the network to update the cost factor data, the manufacturing cost can be calculated using the latest cost factor data that have been updated. The providers of cost factor data, i.e., a plurality of makers, can be update the cost factor data which they have provided, depending on the information provided by the estimate seeker, it is possible to calculate a highly accurate cost in a short period of time depending on the information provided by the estimate seeker.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus for estimating a manufacturing cost for a product comprising:
    a first input device for receiving input data concerning physical characteristics of the product to be manufactured at multiple stages of design;
    a cost calculation processor adapted to calculate the manufacturing cost based on information received from said first input device for one or more process series;
    a first external input device capable of communicating with the cost calculation processor, and operable by a first external supplier to independently supply initial and updated cost data to the cost calculation processor;
    a second external input device capable of communicating with the cost calculation processor, and operable by a second external supplier to independently supply initial and updated cost data to the cost calculation processor;
    the cost calculation processor being adapted to recalculate the manufacturing cost each time updated cost factor data is supplied by each of the first and second external suppliers;
    a memory for storing each of the calculated manufacturing costs; and
    a display device adapted to simultaneously display revised calculated manufacturing costs for both of the first and second external suppliers each time either one or both of the first and second external suppliers supplies the initial or the updated cost data at the multiple stages of design, so that a user can determine which of the first and second external suppliers is better at each of the multiple stages of design.

2. The apparatus according to claim 1, wherein said cost calculation processor is adapted to calculate manufacturing costs for individual process steps of the plurality of process series; and wherein said display device displays the calculated manufacturing costs for the individual process steps.

3. The apparatus according to claim 2, wherein said physical characteristics include at least one of a shape, a thickness, and a material composition of the product to be manufactured.

4. The apparatus according to claim 3, further comprising:
    a variable cost memory; and
    a fixed cost memory.

5. The apparatus according to claim 4, wherein said variable cost memory and said fixed cost memory are connected to said cost calculation processor via an in-house net connection.

6. The apparatus according to claim 4, wherein said variable cost memory and said fixed cost memory are connected to said cost calculation processor via an internet connection.

7. The apparatus according to claim 4, wherein said first input device is located in an in-house development department.

8. The apparatus according to claim 7, wherein said external suppliers receive data from in-house production facilities and outsourced component makers.

9. The apparatus according to claim 8, wherein said in-house production facilities are connected to said external suppliers via an in-house net connection, and wherein said outsourced component makers are connected to said external suppliers via an internet connection.

10. The apparatus according to claim 1, wherein the cost calculation processor includes:
    a manufacturing cost price calculator for calculating manufacturing cost price elements based on cost prices received from a manufacturing cost price data base and data presented by an display information processor and an input information processor;
    a variable cost element calculator for calculating variable cost elements based on variable cost factors received from a variable cost database and data processed by the input information processor; and
    a cost calculation processor for adding manufacturing cost price elements calculated by the manufacturing cost price element calculator and variable cost elements calculated by the variable cost element calculator into a cost total.

11. The apparatus according to claim 1, the manufacturing costs are compared based on differences between the process series including a series of different processing processes, and also differences between the process series including a series of single processing processes.

12. The apparatus according to claim 1, wherein the multiple calculated manufacturing costs at the multiple stages of design for each of the at least two external suppliers are displayed along a vertical column, the vertical column for each of the external suppliers being arranged side-by-side, so that the user can visually determine which of the at least two external suppliers is better at each of the multiple stages of design.

13. The apparatus according to claim 1, wherein the multiple calculated manufacturing costs at the multiple stages of design for each of the at least two external suppliers are displayed, so that the user can compare the calculated manufacturing cost of one external supplier with the manufacturing costs of the at least two external suppliers at each of the multiple stage of design.

14. The apparatus according to claim 1, wherein the multiple calculated manufacturing costs at the multiple stages of design for each of the at least two external suppliers are displayed, so that the user can compare the calculated manufacturing cost of one external supplier with the manufacturing costs of the at least two external suppliers at each of the multiple stage of design.

15. The apparatus according to claim 1, wherein said external suppliers receive data from in-house production facilities and outsourced component makers.

16. The apparatus according to claim 15, wherein said in-house production facilities are connected to said external suppliers via an in-house net connection, and wherein said outsourced component makers are connected to said external suppliers via an internet connection.

17. An apparatus for estimating a manufacturing cost for a product comprising:
    a first input device and an associated first display device for receiving and viewing input data concerning physical characteristics of the product to be manufactured at multiple stages of design of the product;
    a cost calculation processor for calculating the manufacturing cost based on information received from said first input device at each stage of design of the product, and initial cost factor data independently supplied from at least two external suppliers using separate input devices, the cost calculation processor being adapted to recalculate the manufacturing cost based on updated cost factor data supplied by each of the at least two external suppliers;
    said first display device for displaying the calculated manufacturing costs from said cost calculation processor,
    wherein, upon entering a plurality of alternative process series for manufacturing the product at each of the multiple design stages via said first input device, said cost calculation processor calculates a plurality of alternative manufacturing costs for the at least two external suppliers, with each of the alternative manufacturing costs being associated with a respective one of the plurality of alternative process series for manufacturing the product at each of the multiple design stages, the first display device simultaneously displaying the calculated manufacturing costs at the multiple stages of design for the at least two external suppliers, so that a user can determine which of the at least two external suppliers is better at each of the multiple stages of design,
    said first display device being adapted to simultaneously display revised cost factor data for all of the at least two external suppliers each time either one or more of the at least two external suppliers independently supplies the initial or the updated cost factor data using the separate input devices, and each time alternative physical characteristics of the product to be manufactured are inputted using the first input device.

18. The apparatus according to claim 17, wherein the multiple calculated manufacturing costs at the multiple stages of design for each of the at least two external suppliers are displayed along a vertical column, the vertical column for each of the external suppliers being arranged side-by-side, so that the user can visually determine which of the at least two external suppliers is better at each of the multiple stages of design.

* * * * *